(12) United States Patent
Kwak et al.

(10) Patent No.: US 10,333,674 B2
(45) Date of Patent: Jun. 25, 2019

(54) METHOD AND APPARATUS FOR TRANSMITTING UPLINK CONTROL INFORMATION IN A WIRELESS COMMUNICATION SYSTEM

(71) Applicant: LG ELECTRONICS INC., Seoul (KR)

(72) Inventors: Kyuhwan Kwak, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/442,585

(22) Filed: Feb. 24, 2017

(65) Prior Publication Data

US 2017/0251463 A1    Aug. 31, 2017

Related U.S. Application Data

(60) Provisional application No. 62/300,097, filed on Feb. 26, 2016, provisional application No. 62/401,930, filed on Sep. 30, 2016, provisional application No. 62/417,308, filed on Nov. 3, 2016, provisional application No. 62/420,694, filed on Nov. 11, 2016.

(51) Int. Cl.
*H04W 4/00* (2018.01)
*H04L 5/00* (2006.01)

(52) U.S. Cl.
CPC .............. *H04L 5/0053* (2013.01); *H04L 5/00* (2013.01); *H04L 5/0055* (2013.01)

(58) Field of Classification Search
None
See application file for complete search history.

(56) References Cited

U.S. PATENT DOCUMENTS

| 2016/0006548 | A1* | 1/2016 | Yang | H04L 5/0094 370/329 |
| 2017/0251463 | A1* | 8/2017 | Kwak | H04L 5/00 370/328 |
| 2017/0332369 | A1* | 11/2017 | Hosseini | H04W 72/0413 370/329 |
| 2018/0331807 | A1* | 11/2018 | Kim | H04W 74/0833 370/328 |

(Continued)

*Primary Examiner* — Anh Vu H Ly
(74) *Attorney, Agent, or Firm* — Lee, Hong, Degerman, Kang & Waimey PC

(57) ABSTRACT

In the present invention, a method for transmitting uplink control information in a wireless communication system and an apparatus for supporting the same are disclosed. Particularly, a method for transmitting uplink control information performed by a terminal in a wireless communication system may comprise receiving, from a base station, a message comprising a specific symbol index indicating a starting point of the uplink control channel region of the terminal and a specific comb index indicating a comb structure of the uplink control channel region of the terminal and transmitting, to the base station, uplink control information by using at least one resource element corresponding to the received specific symbol index and the received specific comb index, wherein the specific comb index is allocated according to the number of symbols configuring the uplink control channel region of the terminal.

16 Claims, 12 Drawing Sheets

(56) References Cited

U.S. PATENT DOCUMENTS

| | | | | |
|---|---|---|---|---|
| 2018/0376495 A1* | 12/2018 | Lee | ............................ | H04L 5/00 |
| | | | | 370/328 |
| 2019/0028162 A1* | 1/2019 | Lee | ........................ | H04B 7/0486 |
| | | | | 370/328 |
| 2019/0029052 A1* | 1/2019 | Yang | .................. | H04W 74/0833 |
| | | | | 370/328 |

* cited by examiner

Fig. 4
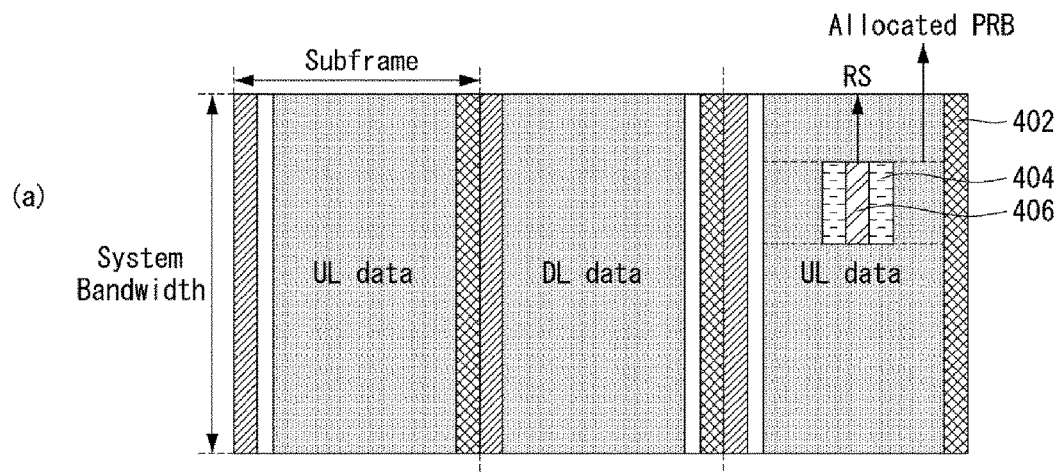
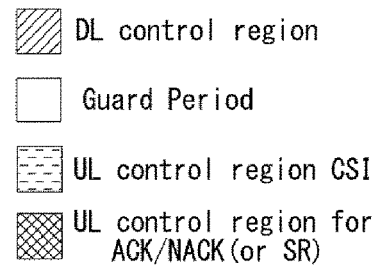
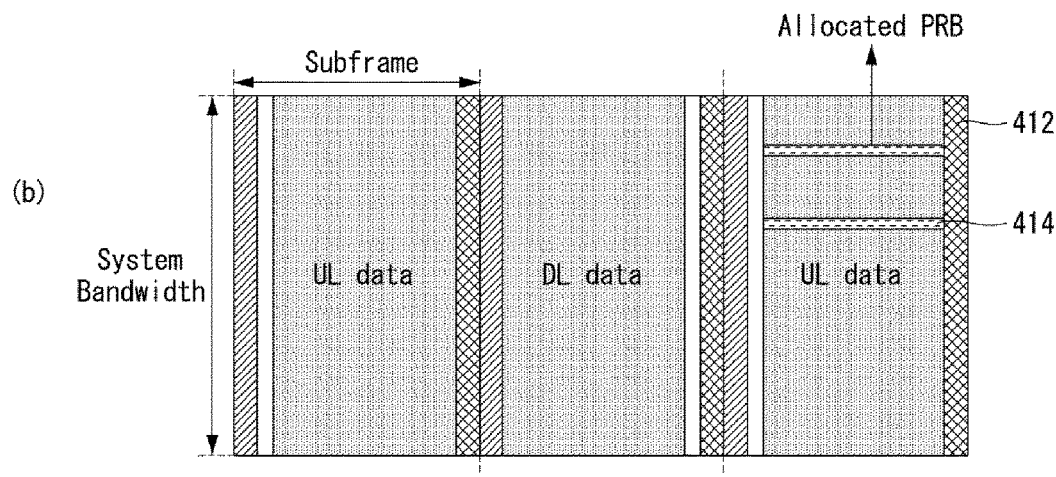

Fig. 7
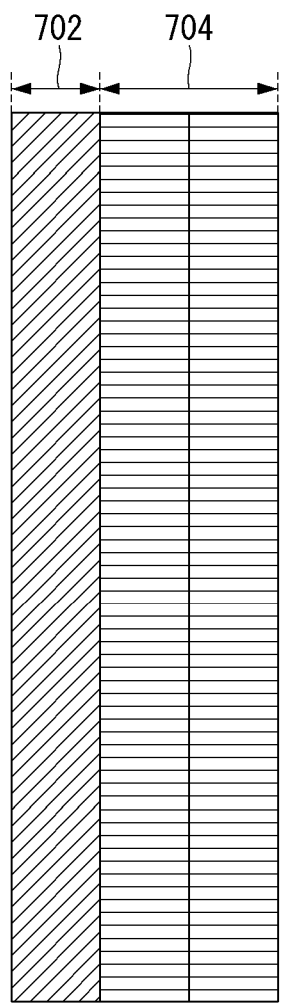
(a)
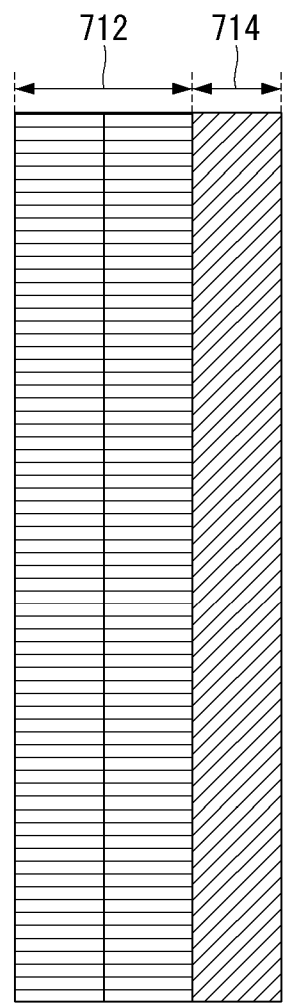
(b)
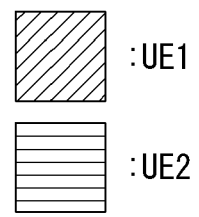

Fig. 9a
UE with one symbol
UL control region
(even comb)
UE with one symbol
UL control region
(odd comb)
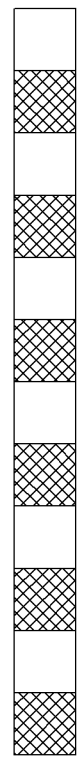
(a)          (b)

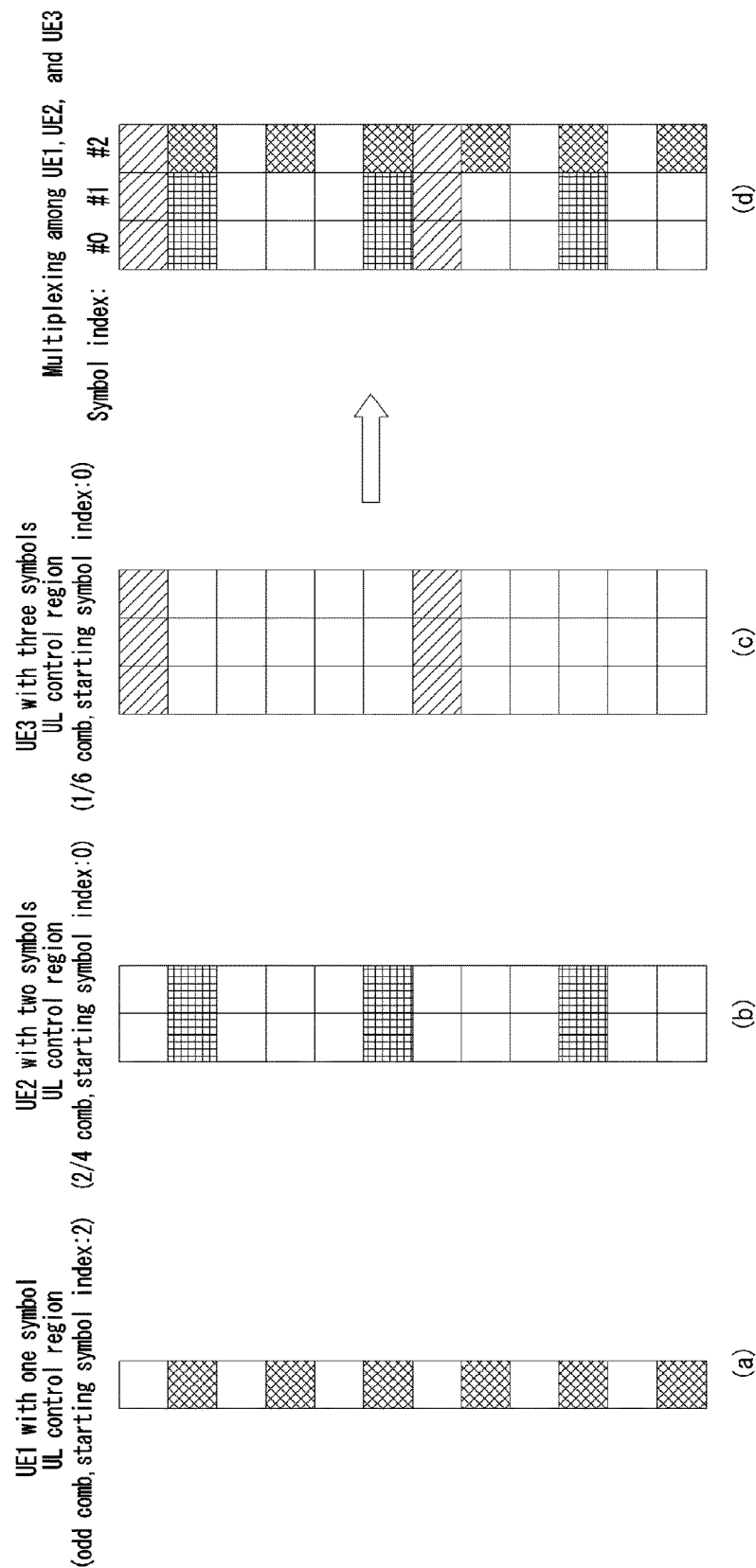

METHOD AND APPARATUS FOR TRANSMITTING UPLINK CONTROL INFORMATION IN A WIRELESS COMMUNICATION SYSTEM

CROSS-REFERENCE TO RELATED APPLICATION

Pursuant to 35 U.S.C. § 119(e), this application claims the benefit of earlier filing date and right of priority to U.S. Provisional Application No. 62/300,097, filed on Feb. 26, 2016, U.S. Provisional Application No. 62/401,930, filed on Sep. 30, 2016, U.S. Provisional Application No. 62/417,308, filed on Nov. 3, 2016, and U.S. Provisional Application No. 62/420,694, filed on Nov. 11, 2016, the contents of which are all incorporated by reference herein in their entirety.

BACKGROUND OF THE INVENTION

Field of the Invention

The present invention relates to a wireless communication system, and more particularly, to a method for transmitting uplink control information and an apparatus for supporting the same.

Discussion of the Related Art

The mobile communication system is developed to provide the voice service while guaranteeing the activity of a user. However, the mobile communication system is extended to the data service in addition to the voice service. Currently, since the shortage of resource is caused owing to the explosive traffic increase and users requires higher services, more developed mobile communication system is needed.

The requirement for the next mobile communication system should support the acceptance of explosive data traffic increase, the innovative increase of transmission rate per user, the acceptance of the number of connection devices which are dramatically increased, very low End-to-End Latency, high energy efficiency. To this end, various techniques have been researched such as the Dual Connectivity, the Massive Multiple Input Multiple Output (Massive MIMO), the In-band Full Duplex, the Non-Orthogonal Multiple Access (NOMA), the Super wideband support, the Device Networking, and so on.

SUMMARY OF THE INVENTION

When an uplink control channel and a downlink control channel are together disposed in the same subframe (e.g., a self-contained subframe structure), a scheme in which a control channel region is configured to be small as possible is basically considered. However, when the amount to uplink control information which needs to be processed in an uplink control channel region As a result, the present invention proposes a method for configuring an uplink control channel region according to uplink information (e.g., ACK/NACK, SR, CSI, and/or uplink data) transmitted in a wireless communication system.

Further, the present invention proposes a method for configuring the uplink control channel region according to criteria (e.g., coverage of a terminal, urgency of the terminal, division of subbands, and the like) of the transmitted uplink information in the wireless communication system.

In addition, the present invention proposes a method for applying different multiplexing methods to uplinks channels configured in such a method.

Moreover, the present invention proposes a method for performing multiplexing between the terminals in the uplink control channel region configured in such a method.

The technical objects of the present invention are not limited to the aforementioned technical objects, and other technical objects, which are not mentioned above, will be apparently appreciated by a person having ordinary skill in the art from the following description.

In an aspect, a method for transmitting uplink control information in a wireless communication system supporting an uplink control channel region configured in at least one symbol is performed by a terminal and comprises receiving, from a base station, a message comprising a specific symbol index indicating a starting point of the uplink control channel region of the terminal and a specific comb index indicating a comb structure of the uplink control channel region of the terminal and transmitting, to the base station, uplink control information by using at least one resource element corresponding to the received specific symbol index and the received specific comb index. The specific comb index is allocated according to the number of symbols configuring the uplink control channel region of the terminal.

Furthermore, the uplink control channel region configured in at least one symbol may be included in the same frame with a downlink control channel region and the uplink control channel region of the terminal may be included in the uplink control channel region configured in at least one symbol.

Furthermore, the specific symbol index may indicate a starting point in at least one candidate point for the uplink control channel region of the terminal.

Furthermore, the specific symbol index may indicate one of 0, 1, to $$\left(\left\lceil\frac{k}{j}\right\rceil-1\right),$$

the k represents the number of symbols configuring the uplink control channel region supported by the wireless communication system and the j represents the number of symbols configuring the uplink control channel region of the terminal.

Furthermore, the at least one resource element corresponding to the received specific symbol index and the received specific comb index may be non-overlapped with at least one resource element for transmitting uplink control information of another terminal supported by the base station.

Furthermore, the number of the at least one resource element corresponding to the received specific symbol index and the received specific comb index may be equal to the number of the at least one resource element for transmitting uplink control information of another terminal.

Furthermore, the message may be received from the base station by using at least one of higher layer signaling or physical layer signaling.

In another aspect, an apparatus for transmitting uplink control information in a wireless communication system supporting an uplink control channel region configured in at least one symbol comprises a transceiver for transmitting and receiving a radio signal, and a processor functionally coupled to the transceiver. The processor is configured to control to receive, from a base station, a message comprising a specific symbol index indicating a starting point of the uplink control channel region of the terminal and a specific comb index indicating a comb structure of the uplink control channel region of the terminal and transmit, to the base station, uplink control information by using at least one resource element corresponding to the received specific symbol index and the received specific comb index. The specific comb index is allocated according to the number of symbols configuring the uplink control channel region of the terminal.

According to embodiments of the present invention, in a limited resource region, a terminal may efficiently transmit at least one uplink control information according to the type or the amount of uplink control information.

Further, the terminal can efficiently transmit at least one uplink control information regardless of a characteristic of coverage or urgency of the corresponding terminal.

In addition, even when multiple terminals need to simultaneously transmit the uplink control information, the terminal can efficiently transmit at least one uplink control information.

Effects which can be obtained in the present invention are not limited to the aforementioned effects and other unmentioned effects will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

FIG. 4 illustrates one example of the uplink control channel region in the case where uplink control information is transmitted together uplink data, to which the present invention can be applied.

FIG. 7 illustrates one example of a TDM scheme between terminals that support the uplink control channel constituted by different symbols, to which the present invention can be applied.

FIGS. 9A to 9C illustrate examples of a comb structure for a resource element of the uplink control channel, to which the present invention can be applied.

FIG. 10 illustrates one example of comb structure multiplexing for the terminals in which the uplink control channel is configured in different structures and the different numbers of symbols, to which the present invention can be applied.

DETAILED DESCRIPTION OF THE EMBODIMENTS

Figure 1:
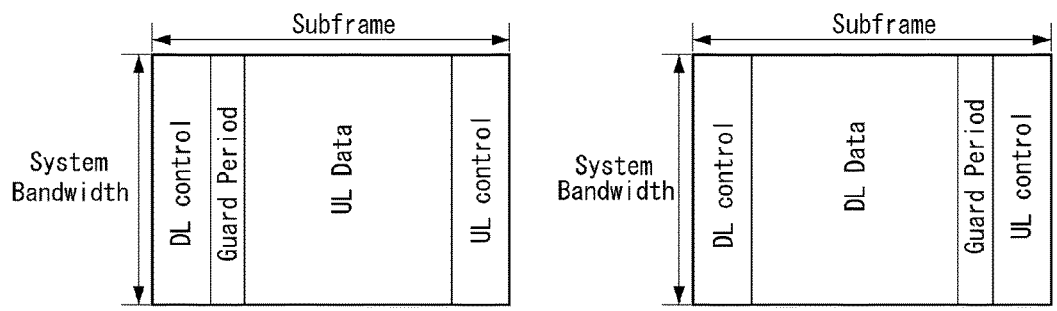
FIG. 1 illustrates one example of the structure of a subframe to which the present invention can be applied.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Self-Contained Subframe Structure

As propagation of smart phones and Internet of things (IoT) terminals rapidly spreads, the amount of information which is transmitted and received through a communication network explosively increases. As a result, in a next-generation wireless access technology, an environment is required, which provides a more rapid service to more users in the existing communication system. To this end, a design of a communication system that considers machine type communication (MTC) providing a service by connecting multiple devices and objects and a technology for reducing latency of communication is discussed. Hereinafter, in the present specification, for convenience of explanation, the next-generation wireless access technology is referred to as a new RAT (NR) radio access technology and the wireless communication system to which the NR is applied is referred to as an NR system.

A time division duplexing (TDD) structure considered in the NR system is a structure in which both uplink (UL) and downlink (DL) are processed in one subframe. The structure is referred to as a self-contained subframe structure. In more detail, uplink (UL) control information and downlink (DL) control information are transmitted in one self-contained subframe. On the contrary, uplink data or downlink data is transmitted in one self-contained subframe. When uplink transmission is performed after downlink transmission in the self-contained subframe, a guard period (GP) may be inserted therebetween. A detailed example thereof is illustrated in FIG. 1.

FIG. 1 illustrates one example of the structure of a subframe to which the present invention can be applied. FIG. 1 is only for convenience of explanation and does not limit the scope of the present invention.

FIG. 1A illustrates the structure of the self-contained subframe for transmitting the uplink (UL) data and FIG. 1B illustrates the structure of the self-contained subframe for transmitting the downlink (DL) data.

Hereinafter, in the present specification, when the self-contained subframe is considered in the NR system, a method for configuring (alternatively, designing) an uplink (UL) control channel for transmitting the uplink control information will be described.

In detail, in order to support the self-contained subframe structure, provided are (1) a method for flexibly configuring the uplink (UL) control channel region according to transmitted information, (2) a method for flexibly configuring the UL control channel region according to criteria (e.g., coverage of a terminal, urgency of the terminal, division of subbands, and the like) other than the transmitted information, (3) a method for applying different multiplexing methods to channels configured according to the method, and (4) a method for performing multiplexing among the terminals in an uplink channel configured according to the method. Herein, the transmitted information may mean uplink control information transmitted in the uplink control channel region.

For example, in the uplink control channel region, the terminal may transmit a scheduling request (SR) for uplink transmission, ACK/NACK information for data transmitted by downlink, and/or channel state information (CSI). Meanwhile, in the self-contained subframe structure, both a control channel region and a data channel region are disposed in a limited resource. In this case, a method may be primarily considered, which configures the control channel region with 1 symbol by considering data rate of the terminal. In the present invention, the structure of the control channel region is referred to as a basic uplink (UL) control channel.

However, in the case where the number of ACKs/NACKs required to be processed in the control channel region is large, the case where CSI information in which the number of bits is large is transmitted, and/or the terminal in which the coverage is not excellent transmits control information, another scheme other than the basic uplink control channel needs to be considered.

Contents and methods proposed in the present specification are described only in the self-contained subframe structure for convenience of explanation, but the contents and the methods may be applied even to a downlink (DL) control channel region, a guard period (GP), and uplink (UL) only subframe in which a downlink data region does not exist.

Further, a wireless apparatus, a transmitting apparatus, a receiving apparatus, and a transmitting/receiving apparatus may mean apparatuses that may mean at least one of transmission and reception of a signal and include a terminal, a base station, and the like.

In addition, the wireless apparatus may support the NR system and additionally support even a legacy LTE system.

Further, hereinafter, respective embodiments are distinguished for each description and the respective embodiments may be implemented combinationally with each other or independently.

(1) Method for Configuring Uplink Control Channel Region According to Transmitted Information As described above, information which may be transmitted to the uplink control channel region may be classified into the SR, ACK/NACK, and CSI information. The uplink control channel region may be configured differently depending on the transmitted information. In other words, the uplink control channel may be flexibly configured depending on the transmitted information.

In addition to criteria presented through examples described below, the uplink control information transmitted to each region while maintaining the uplink control channel regions (alternatively, uplink control transmission regions) having different structures may be configured differently from the examples described below.

Method for Configuring Uplink Control Channel Region when Terminal Transmits ACK/NACK and/or SR The ACK/NACK information may be transmitted with a maximum of 2 bits by considering spatial multiplexing. In the case of the SR, the terminal (alternatively, a user or user equipment) may implicitly announce the SR or not to the base station according to a resource location where the SR is transmitted or transmit the SR by using 1 bit. In the case where the terminal transmits the ACK/NACK to the base station together with the SR, when carrier aggregation (CA) is considered, both information may be configured with a maximum of 11 bits (e.g., 5 component carriers (CCs). In this case, the terminal may transmit the both information by using a basic control channel region (alternatively, structure) using 1 symbol as a time axis.

Figure 2:
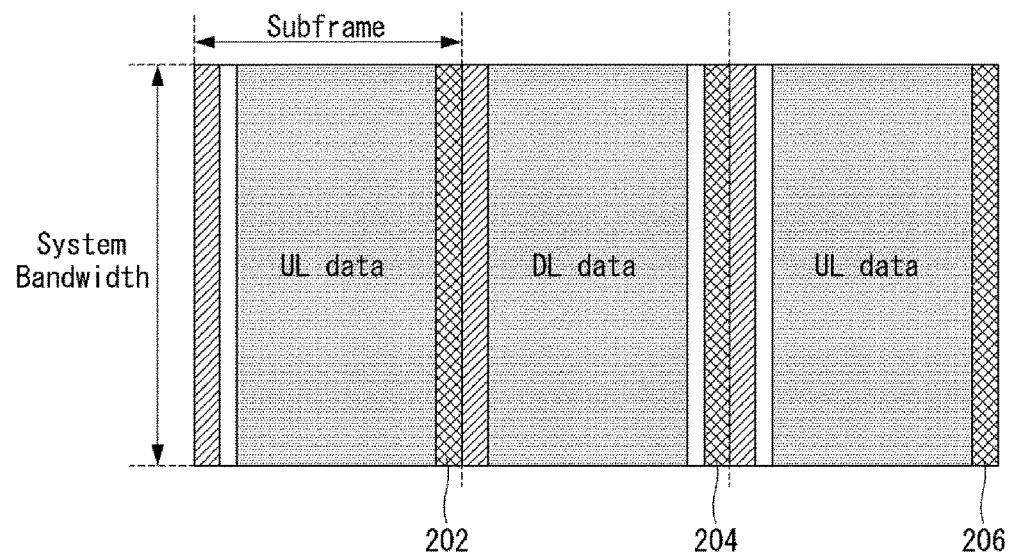
FIG. 2 illustrates one example of an uplink control channel region in the case where an ACK/NACK and/or SR are/is transmitted, to which the present invention can be applied.

FIG. 2 illustrates one example of an uplink control channel region in the case where an ACK/NACK and/or SR are/is transmitted, to which the present invention can be applied. FIG. 2 is only for convenience of explanation and does not limit the scope of the present invention.

Referring to FIG. 2, regions 202, 204, and 206 represent the uplink control channel regions in respective subframes. The regions 202, 204, and 206 may mean channel regions configured per 1 symbol.

As described above, the terminal may transmit the ACK/NACK and/or the SR by using the regions 202, 204, and/or 206. Herein, the regions 202, 204, and 206 may mean the basic uplink control channel regions.

Method for Configuring Uplink Control Channel Region when Terminal Transmits ACK/NACK (and/or SR) and CSI In the case where the terminal needs to transmit both the ACK/NACK information and the CSI, the terminal may transmit the ACK/NACK information through the basic uplink control channel (e.g., the uplink control channel region per 1 symbol) and transmit the CSI through regions at both ends of a system bandwidth. The regions at both ends of the system bandwidth are regions configured to transmit the CSI (alternatively, CSI transmission regions) and the terminal may transmit the CSI in a frequency division multiplexing (FDM) scheme by using the regions. In this case, the terminal may transmit the CSI in a non-contiguous scheme in the CSI transmission region. Alternatively, the terminal may acquire a frequency diversity effect by using a slot hopping scheme that divides resources per slot (on the time axis).

Further, in various embodiments of the present invention, the CSI transmission region is not limited only to both ends of the system bandwidth and may be constituted by regions which are spaced apart from each other in the middle of the system bandwidth.

A time division multiplexing scheme or the frequency division multiplexing scheme may be applied between the basic uplink control channel region and the CSI transmission region.

Figure 3:
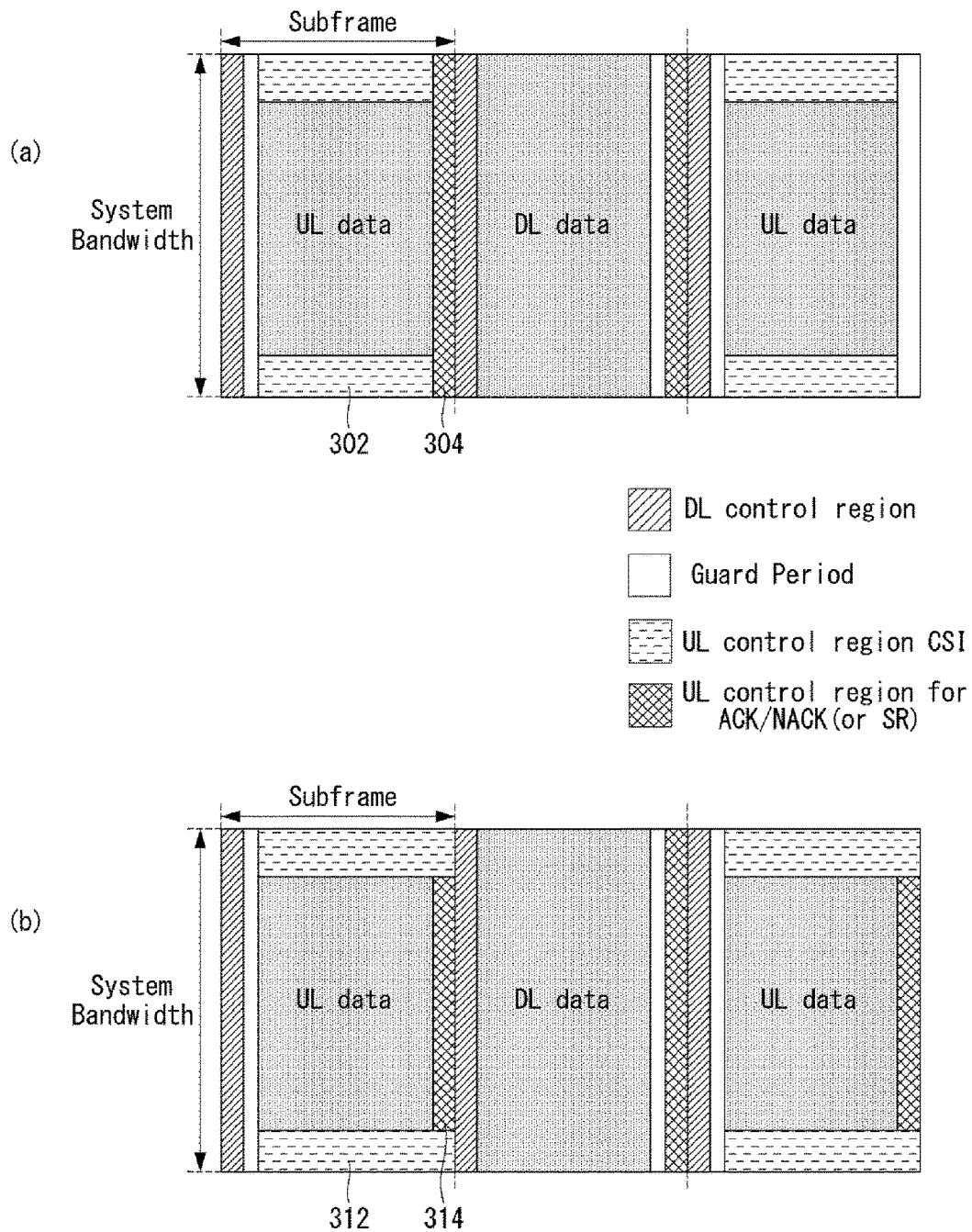
FIG. 3 illustrates examples of the uplink control channel region in which a basic uplink control channel region and a CSI transmission region are multiplexed, to which the present invention can be applied.

FIG. 3 illustrates examples of the uplink control channel region in which a basic uplink control channel region and a CSI transmission region are multiplexed, to which the present invention can be applied. FIG. 3 is only for convenience of explanation and does not limit the scope of the present invention.

As illustrated in FIG. 3(a), the time division multiplexing (TDM) scheme may be applied between a CSI transmission region 302 and a basic uplink control channel region 304. Alternatively, as illustrated in FIG. 3(b), the frequency division multiplexing (FDM) scheme may be applied between a CSI transmission region 312 and a basic uplink control channel region 314. In the case of FIG. 3, the downlink (DL) control region and the guard period exist in the subframe in which the CSI transmission region is configured, but even when a downlink (DL) data region is included, the CSI transmission region may be configured. In this case, the downlink data region exists in front of the guard period and may be multiplexed with an uplink region in the TDM scheme.

When the CSI transmission region is configured as described above, the number of resource blocks (RBs) corresponding to the CSI transmission region may be configured to be changed for each subframe.

Further, in the case of FIG. 3, the uplink control channel region (herein, meaning the CSI transmission region) is configured in the subframe transmitting the uplink data by using the FDM transmission scheme, but if the base station (eNB) supports a full duplex radio (FDR) scheme, the uplink control channel region may be configured even in an area transmitting the downlink data in the FDM scheme. In this case, the base station may not schedule the downlink data to the resource configured as the uplink control channel region but simultaneously perform transmission of the downlink data and reception of the uplink control information through the FDR scheme.

Further, in various embodiments of the present invention, in the case where the terminal using the structure transmits both the ACK/NACK information and the CSI, power of the region transmitting the CSI in a last symbol may vary by transmission of the ACK/NACK information in the FDM structure (a structure in which the uplink control channel regions are multiplexed in the FDM scheme) illustrated in FIG. 3(b). Therefore, the terminal may transmit the uplink control information by using the TDM structure (a structure in which the uplink control channel regions are multiplexed in the TDM scheme) illustrated in FIG. 3(a) by considering the power.

Alternatively, the terminal that transmits only the CSI may transmit the CSI to terminals that transmit the uplink control information by using the FDM structure illustrated in FIG. 3(b), by using up to the last symbol and the terminal that simultaneously transmits the CSI and the ACK/NACK may puncture a region where a CSI region (CSI transmission region 312) overlaps with an ACK/NACK region and transmit the CSI by using residual symbols. For example, the terminal punctures the last symbol where both regions overlap with each other to transmit the CSI by using symbols before the last symbol.

That is, the structure of the uplink control channel region may be configured differently for each terminal in the case of FIG. 3(a) (that is, the TDM scheme) or in the case of FIG. 3(b) (that is, the FDM scheme). In the structure illustrated in FIG. 3, the ACK/NACK region, that is, the basic uplink control channel region may be limited to one last symbol of the subframe or extended to multiple symbols.

Further, in various embodiments of the present invention, the terminal that transmits only the CSI may transmit the CSI transmission region (e.g., the CSI transmission region 302 or 312) or transmit the CSI through the ACK/NACK transmission region (e.g., the basic uplink control channel region 304 or 314). In this case, the terminal may announce information on by which region the CSI is transmitted to the base station through higher layer signaling and/or physical layer signaling.

For example, in order to indicate through which region between both regions the CSI is transmitted, in the case where the terminal transmits a periodic CSI, an aperiodic CSI, and/or a semi-persistent CSI, the base station may define indexes for the CSI transmission region and the ACK/NACK region through the higher layer signaling in advance. By using the defined indexes, the base station may announce a region to which the CSI will be transmitted by a method such as ACK/NACK resource indicator/indication (ARI) dynamically through the higher layer signaling.

In this case, a method for signaling the ARI may vary depending on the type of the transmitted CSI. In more detail, in the case of the aperiodic CSI, the base station may announce the region to which the CSI will be transmitted through an uplink (UL) grant or downlink (DL) assignment region of downlink control information (DCI). Further, the base station may announce the region to which the CSI is transmitted through a radio resource control (RRC) message in the case of the periodic CSI and through an activation/deactivation message in the case of the semi-persistent CSI.

As described above, a resource for transmitting the uplink control information may be constituted by the resource for the uplink data, and the FDM scheme and the TDM scheme. In this case, a method needs to be considered, which transmits the uplink control information in a region where both schemes overlap with each other. In this case, a method for puncturing the region configured by each scheme is configured by a different scheme and a method for rate-matching the region and/or a method for dropping the region may be considered.

For example, the terminal may be allocated with the resource regions configured by both schemes and thereafter, puncture a resource region (hereinafter, referred to as an FDM region for convenience of explanation) configured by the FDM scheme for a resource region (hereinafter, referred to as a TDM region for convenience of explanation) configured by the TDM scheme in a situation in which both regions overlap with each other. Alternatively, the terminal may apply rate-matching to the FDM region by considering the TDM region. Alternatively, the terminal may drop the FDM region.

Contrary to this, as another example, the terminal may be allocated with all of the resource regions configured by both schemes and thereafter, puncture the TDM region of the FDM region in the situation in which both regions overlap with each other. Alternatively, the terminal may apply rate-matching to the TDM region by considering the FDM region. Alternatively, the terminal may drop the TDM region.

Further, in the region configured by each scheme, the terminal may transmit the uplink control information by using one region of both regions or all of both regions according to the type of the uplink control information (UCI) or a combination of the types of the uplink control information. For example, as described above (e.g., FIG. 3), the terminal may transmit the CSI in the FDM region (e.g., the CSI transmission region 302 or 312 of FIG. 3) and transmits a hybrid automated repeat request (HARQ)-ACK and/or SR in the TDM region (e.g., the basic uplink control channel region 304 or 314 of FIG. 3). Contrary to this, the terminal may transmit the HARQ-ACK and/or SR in the FDM region and transmit the CSI in the TDM region.

In this case, the resource region which is punctured, rate-matched, or dropped may be determined according to a priority of the uplink control information transmitted while being included in each region. For example, the terminal may puncture the resource region configured by the different scheme for the region transmitting the uplink control information having a high priority and rate-match the region transmitting the uplink control information having a low priority by considering the resource region configured by the different scheme. Alternatively, the terminal may drop the region transmitting the uplink control information having the low priority.

Further, in various embodiments of the present invention, a reference signal (RS) may be included in the region where both regions overlap with each other according to a transmission structure of the signal transmitted in the FDM region and/or the TDM region. In this case, the high priority may be allocated to a scheme in which the signal is transmitted in the structure including the RS in the region where both regions overlap with each other.

For example, when the transmission structure in the TDM region has the RS and the transmission structure in the FDM region does not have the RS in the region where both regions overlap with each other, the high priority may be allocated to the TDM region. As a result, with respect to the region where both regions overlap with each other, the FDM region may be punctured for the TDM region, rate-matched with the FDM region allocated with the low priority by considering the TDM region or the FDM region may be dropped. Further, it is apparent to those skilled in the art that a contrary case thereto is available.

Further, in various embodiments of the present invention, the base station may allocate the priority for the FDM/TDM configuration region in the structure of the subframe structure and/or the structure to the terminal. For example, the base station may designate the terminal to transmit the uplink control information by using the TDM structure every even-numbered subframes (alternatively, subframes at a predetermined intervals). In this case, the TDM structure has the priority in the corresponding subframe, the FDM structure may be punctured similarly to the scheme when the TDM structure overlaps with the FDM structure, the rate-matching may be applied to the FDM structure, or the FDM structure may be dropped.

In this case, an option for the puncturing, the rate-matching, and/or the drop may be predefined in the system (e.g., the NR system). Alternatively, the base station may announce information on the option to the terminal through the higher layer signaling and/or physical layer signaling.

Further, in various embodiments of the present invention, the terminal may transmit the uplink control information by using one region of both regions (the TDM region and the FDM region) or all of both regions according to a payload size. For example, the terminal may transmit information corresponding to the number (that is, the number of bits set to be transmitted in the TDM scheme) of bits which may be transmitted in the TDM region and transmit information corresponding to the number of bits, which is more than the number of bits which may be transmitted in the TDM region, in the FDM region. As another example, the terminal may transmit information corresponding to the number (that is, the number of bits set to be transmitted in the FDM scheme) of bits which may be transmitted in the FDM region and transmit information corresponding to the number of bits, which is more than the number of bits which may be transmitted in the FDM region, in the TDM region.

In this case, a method may also be considered, in which the terminal transmits the uplink control information having the high priority by using a region in which the number of transmittable bits is set according to the priority of the uplink control information. Herein, the region in which the number of transmittable bits is set and/or the corresponding number of bits may be predefined in the system. Alternatively, the base station may announce information on the region in which the number of transmittable bits is set and/or the corresponding number of bits to the terminal through the higher layer signaling and/or physical layer signaling.

Matters disclosed in the present invention may be applied to a situation in which the resources physically overlap with each other (e.g., time and frequency regions overlap with each other). Contrary to this, in a situation in which the resources do not physically overlap with each other (e.g., do not overlap with each other on the time axis or frequency axis), the terminal may transmit the uplink control information without a separate additional operation in each resource region. However, although the resource does not overlap with each other, the matters disclosed in the present invention may be applied to a case where the resources overlap with each other only on the time axis (e.g., a single carrier property).

Method for Configuring Uplink Control Channel Region when Terminal Transmits Both Uplink (UL) Data and ACK/NACK (and/or SR) and CSI Unlike the schemes, the terminal may transmit both the uplink data and the uplink control information (ACK/NACK (and/or SR) and CSI). To this end, the terminal is allocated with at least one physical resource block (PRB) for data transmission in the uplink data region. In this case, the terminal may transmit the ACK/NACK information by using the basic uplink control channel (e.g., the region 202, 204, or 206 of FIG. 2) and transmit the CSI in the uplink data region (that is, the uplink data transmission region).

FIG. 4 illustrates one example of the uplink control channel region in the case where uplink control information is transmitted together uplink data, to which the present invention can be applied. FIG. 4 is only for convenience of explanation and does not limit the scope of the present invention.

Referring to FIG. 4, the case where the terminal transmits both the uplink (UL) data and the uplink control information in a specific subframe is assumed. In the case of FIG. 4, a case where the terminal transmits the CSI by using a specific region in at least one PRB allocated for transmitting the uplink data is assumed. In this case, the terminal transmits the ACK/NACK information (alternatively, SR) to the base station by using a basic uplink control channel region 402 or 412.

FIG. 4(a) illustrates one example of transmitting the CSI by using the CSI transmission region 404 allocated by a frequency first and/or time first scheme at the side of the RS 406 of the uplink data region.

Unlike this, FIG. 4(b) illustrates one example in which the terminal transmits the CSI by the FDM scheme by allocating the CSI transmission region 414 to both ends based on the frequency axis with respect to the allocated uplink data region. When the terminal transmits the CSI as illustrated in FIG. 4(b), the RS for the uplink control channel may be transmitted at the same position and the number of resources as the RS of the uplink data region or transmitted while being configured differently from the RS of the uplink data region.

In the case of FIG. 4, it is apparent that only the downlink control channel and the guard period exist in the subframe in which the CSI transmission region 404 or 414 is configured, but the scheme may be applied even when the downlink data region exists. In this case, the downlink data region exists in front of the guard period to form the TDM structure with the uplink region.

(2) Method for Configuring Uplink Control Channel Region According to Criteria Other than Transmitted Information Unlike the method for configuring the uplink control channel region according to the transmitted information (e.g., ACK/NACK, CSI, UL data, and the like), the uplink control channel region may be configured according to the characteristics (e.g., the coverage, the urgency, and the like) of the terminal and a configuration scheme (e.g., the subband, and the like) of the system bandwidth.

Method for Transmitting Uplink Control Channel Depending on Coverage of Terminal Since a coverage characteristic may vary for each terminal, a scheme that transmits the uplink control channel may vary depending on the coverage of the terminal (that is, a flexible uplink control channel region configuration depending on the coverage of the terminal). For example, in the case where when the coverage of the terminal is not very excellent (e.g., when the corresponding terminal positioned at the edge of a cell), when the uplink control information (e.g., ACK/NACK) is transmitted only to the basic uplink control channel region (e.g., the uplink control channel region configured with 1 symbol and a region used for transmitting the ACK/NACK in FIGS. 2, 3, and 4), reliable transmission may be impossible.

In this case, the terminal may transmit the uplink control information by using multiple symbols on the time axis. In other words, in order to solve that the coverage of the terminal is not excellent, more energy is temporally collected to transmit the uplink control information. For example, the terminal may transmit the ACK/NACK information by using the same FDM structure as the CSI transmission region 302 illustrated in FIG. 3(a) or the CSI transmission region 312 illustrated in FIG. 3(b). When the terminal is allocated with the resource to transmit the uplink data, the terminal may transmit the uplink control information by using the same scheme as the CSI transmission region 404 or 414 illustrated in FIG. 4.

Method for Transmitting Uplink Control Channel Depending on Urgency of Terminal

The structure of the uplink control channel may be configured differently depending on the urgency of the terminal (that is, the flexible uplink control channel region configuration depending on the urgency of the terminal). For example, a terminal which requires a rapid feedback may transmit the uplink control information by using the basic uplink control channel region (e.g., the uplink control channel region configured with 1 symbol and the region used for transmitting the ACK/NACK in FIGS. 2, 3, and 4). Since the region is allocated to the basic uplink control channel every subframe, the terminal may transmit the uplink control information rapidly (alternatively, within a short delay time).

Contrary to this, a terminal which is low in urgency may transmit the uplink control information by using the same FDM structure as the CSI transmission region 302 illustrated in FIG. 3(a) or the CSI transmission region 312 illustrated in FIG. 3(b).

Method for Transmitting Uplink Control Channel Through Division of Subbands

A system bandwidth is divided into a plurality of subbands and as the subband unit, an uplink control channel region may be configured in a different structure.

Figure 5:
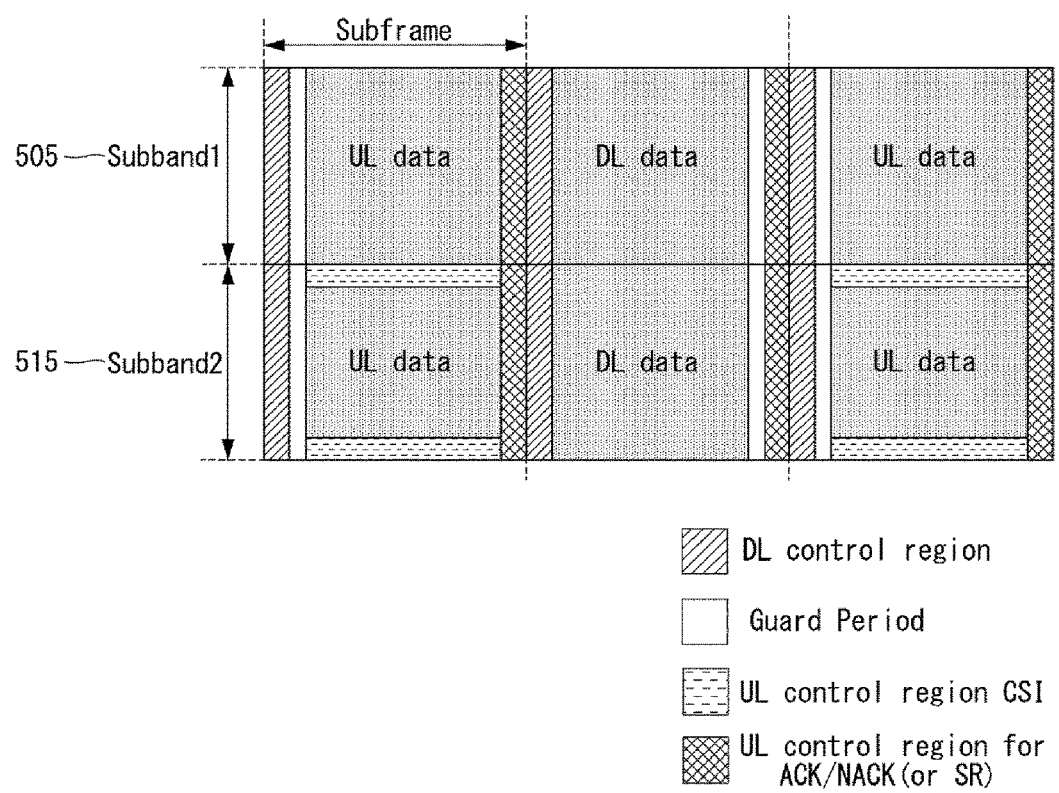
FIG. 5 illustrates one example of an uplink control channel structure configured according to division of subbands, to which the present invention can be applied.

FIG. 5 illustrates one example of an uplink control channel structure configured according to division of subbands, to which the present invention can be applied. FIG. 5 is only for convenience of the description and the scope of the present invention is not limited thereto.

Referring to FIG. 5, it is assumed that an overall system bandwidth is divided into a first subband 505 and a second subband 515. In the first subband 505, the uplink control channel is configured by the basic uplink control channel structure described above, whereas in the second subband 515, a FDM type transmission structure (for example: a structure for CSI transmission described above) and the basic uplink control channel structure may be configured together. In this case, the FDM type transmission structure may be configured by the basic uplink channel region and the FDM structure as illustrated in FIG. 3(b) (in FIG. 5, an example in which two regions are configured by a TDM structure as illustrated in FIG. 3(a).). Further, the uplink control channel of the second subband 515 may be configured by only the FDM type transmission structure without using the basic uplink control channel structure.

In this case, the basic uplink channel region may be allocated by varying the symbol number for each subband and/or for each subframe. That is, a symbol unit configuring the basic uplink channel region for each subband and/or for each subframe may be varied. Further, in the case of the region using the FDM type transmission structure, the region may be allocated by varying the number of resource blocks (RBs) for each subband and/or for each subframe.

In the case of the uplink control channel configured flexibly according to a criterion other than the transmission information described above, the configuration for the corresponding uplink control channel structure may be predefined in the system. Alternatively, a base station may notify information on the configuration to the terminal through higher layer signaling and/or physical layer signaling (e.g.: downlink control information (downlink control indicator)).

(3) Method of Applying Different Multiplexing Schemes Among Configured Uplink Channels As described above, a resource region related with the uplink may be divided into an uplink data region and an uplink control region. The uplink control region may be configured by an FDM scheme (e.g., a CSI transmission region of FIG. 3) and/or a TDM scheme (e.g., a basic uplink control channel region). In this case, different multiplexing schemes may be applied between different channels or the same channels existing in different frequency ranges. The different channels may mean a channel (that is, a UL data channel) for transmitting uplink data and a channel (that is, a UL control channel) for transmitting uplink control information. In addition, the same channels existing in the different frequency ranges may mean UL data channels existing in different frequency ranges or UL control channels existing in different frequency ranges.

For example, in a single carrier (alternatively, between carrier/band combinations), the terminal may transmit data and/or control information by applying both an orthogonal frequency division multiplexing (OFDM) scheme and single carrier frequency-division multiplexing (SC-FDM) scheme. Herein, whether or not to support simultaneously the different multiplexing schemes (the OFDM scheme and the SC-FDM scheme) may be included as the capability of the terminal.

In more detail, in the structure illustrated in FIG. 3, when the terminal simultaneously transmits an uplink data channel (e.g., a physical uplink shared channel (PUSCH)) and an uplink control channel (e.g., a physical uplink control channel (PUCCH)), the terminal may transmit the uplink control channel in the SC-FDM scheme and the uplink data channel in the OFDM scheme. In this case, a difference in processing time may occur with respect to modulation of information to be transmitted from each channel according to the capability of the terminal. Further, between the SC-FDM scheme and the OFDM scheme, a difference in processing time may occur according to whether there is a discrete Fourier transform (DFT) operation and/or the capability of the corresponding terminal.

If different processing times are required due to the above reasons with respect to different channels allocated to be simultaneously transmitted by the terminal and the difference between the different processing times is very large according to the capability of the terminal, it may be difficult for the terminal to transmit simultaneously the different channels. Accordingly, in order to prevent the above problem, the terminal may signal to the base station information on the capability of the corresponding terminal indicating whether the different multiplexing schemes are simultaneously applicable. As a result, the base station may schedule the different channels (e.g., an uplink data channel and an uplink control channel) for the corresponding terminal by reflecting the information.

In addition, the base station may configure the uplink data channel and the uplink control channel to be transmitted by the same multiplexing scheme (e.g., OFDM, SC-FDM) by considering a coverage class and/or a latency of the terminal.

In this case, the base station may notify the above-described configuration to the user through higher layer signaling and/or physical layer signaling.

(4) Multiplexing Method Between Terminals for Configured Uplink Control Channel

For the uplink control channel (e.g., a channel region configured in the FDM scheme and/or a channel region configured in the TDM scheme shown in FIGS. 2, 3, 4, and/or 5) configured as described above, in order to more efficiently utilize the resources, multiplexing between terminals may be performed. In the case of the channel region configured by the TDM scheme, according to a situation, the number of symbols configuring the channel region may be flexibly changed. In other words, according to a situation, the symbol unit of the channel region configured by the TDM scheme may be flexibly changed. In this case, all of the terminals may equally configure uplink control information according to the symbol number configuring the uplink control channel configured in the system and transmit the uplink control information. However, in order to utilize the resources more efficiently, each terminal may configure and transmit uplink control information configured by symbols equal to or different from other terminals. An example of the above-described method is shown in FIG. 6.

Figure 6:
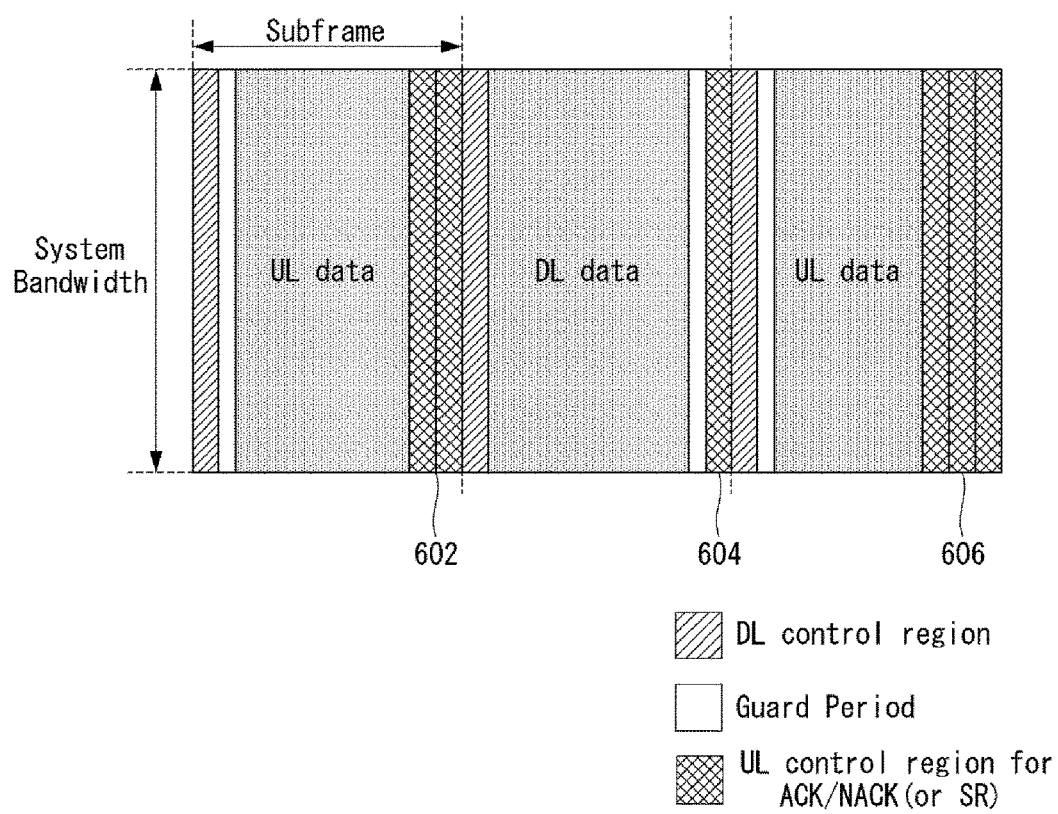
FIG. 6 illustrates one example of the structure of the uplink control channel configured by a flexible method, to which the present invention can be applied.

FIG. 6 illustrates one example of the uplink control channel configured by a flexible method, to which the present invention can be applied. FIG. 6 is only for convenience of the description and does not limit the scope of the present invention.

Referring to FIG. 6, it is assumed that in a first subframe, an uplink channel region 602 configured by two symbols is present, in a second subframe, an uplink channel region 604 configured by one symbol is present, and in a third subframe, an uplink channel region 606 configured by three symbols is present. Further, FIG. 6 illustrates that ACK/NACK (alternatively, SR) is transmitted in the uplink channel regions, but it is not limited thereto, and different uplink control information (e.g., CSI) may be transmitted from the uplink channel regions.

Under the structure illustrated in FIG. 6 (under the structure for the channel region configured by the FDM scheme described above), as described above, in order to utilize the resources more efficiently, the number of symbols used for transmission of the uplink control information between terminals (alternatively, users) may be differently configured. For example, when an uplink channel of a system (e.g., an NR system) is configured by three symbols, an uplink control channel region configured by a different number of symbols for each terminal, based on a coverage class between terminals. More specifically, for transmission of uplink control information, three symbols as the maximum number of symbols, may be allocated to terminals having a poor coverage, two symbols may be allocated to terminals having a medium coverage, and one symbol may be allocated to terminal having a best coverage.

In this case, in the case of transmitting (alternatively, notifying) resources for the uplink control information, it is necessary to notify to each terminal the location of the resource for each terminal configured by a different number of symbols. The base station may notify to the terminal the location of the resource for each terminal through a separate index. For example, when the uplink control channel of the entire system is configured by a total of 'k' symbols and a resource for each terminal is configured by 'j' symbols, a starting point of the resource for each terminal may be one of '0, 1, to $$\left(\left\lceil \frac{k}{j} \right\rceil - 1\right)'.$$

Herein, ⌈x⌉ means a rounding value of 'x'. In this case, the base station may notify to each terminal an index for the starting point of the resource for each terminal (that is, a symbol index or a time index) through higher layer signaling and/or physical layer signaling.

The starting point of the resource for each terminal may mean an index according to an available candidate point. For example, when 'k' is 4 and 'j' is 2, 'two front symbols (a first candidate point)' and 'two rear symbols (a second candidate point)' of a total of four symbols, that is, a total of two available candidate points may be present. In this case, a starting point index 0 (index 0) may indicate the first candidate point, and a starting point index 1 (index 1) may indicate the second candidate point.

When a resource region for the uplink control channel is configured by a plurality of symbols, the resource region may have a different structure for each symbol number. Alternatively, the resource region may have a structure in which the basic structure is repeated as many as the number of symbols by setting one symbol as a basic structure. Further, the structure of the resource region for the uplink control channel may be differently configured according to a type of service. For example, in the case of a terminal for an ultra reliable and low latency communication (URLLC) service, a structure in which a reference signal RS is allocated to a first symbol among a plurality of symbols may be used to reduce the latency of the terminal.

As described above, with respect to the terminals in which the uplink control channel region is configured by various structures and a different symbol number, the multiplexing method between the terminals needs to be considered.

First, with respect to terminals having different structures of uplink control channel resources (e.g., resources for transmitting uplink control channels), multiplexing through the FDM scheme may be performed. Further, with respect to the terminals configured by the same structure for the uplink control channel resource, multiplexing through the TDM scheme may be performed in the uplink control channel resource according to the number of symbols configuring the uplink control channel. For example, when the uplink control channel of the overall system is configured by three symbols and the resources that may be configured by each terminal are 1, 2, and 3 symbol(s), multiplexing may be performed through the inter-terminal TDM scheme. In this case, the uplink control channel resources may be allocated according to a predefined scheme.

FIG. 7 illustrates one example of a TDM scheme between terminals that support the uplink control channel constituted by different symbols, to which the present invention can be applied. FIG. 7 is only for convenience of the description and does not limit the scope of the present invention.

Referring to FIG. 7, it is assumed that a first terminal configures an uplink control channel resource with one symbol, and a second terminal configures an uplink control channel with two symbols.

According to the TDM scheme between terminals configuring the uplink control channels with different symbols, as illustrated in FIG. 7(a), a channel region 702 of the first terminal may be displaced in the front side of the uplink control channel region, and a channel region 702 of the first terminal may be displaced in the rear side of the uplink control channel region. Alternatively, as illustrated in FIG. 7(b), a channel region 712 of the second terminal may be displaced in the front side of the uplink control channel region, and a channel region 714 of the first terminal may be displaced in the rear side of the uplink control channel region.

The content related with the above displacement may be pre-defined in the system, that is, between the terminal and the base station, and each terminal may transmit the uplink control information to the base station according to the predefined displacement. Alternatively, as described above, each terminal may receive index information on a starting point of a resource from the base station and transmit uplink control information by using resources allocated according to the received index information.

Further, in various embodiments of the present invention, a code division multiplexing (CDM) scheme may be considered between the terminals configured by the same structure (i.e., the same resource structure) for the uplink control channel resources, and in this case, multiplexing between the terminals of different symbol units may be considered together.

Figure 8:
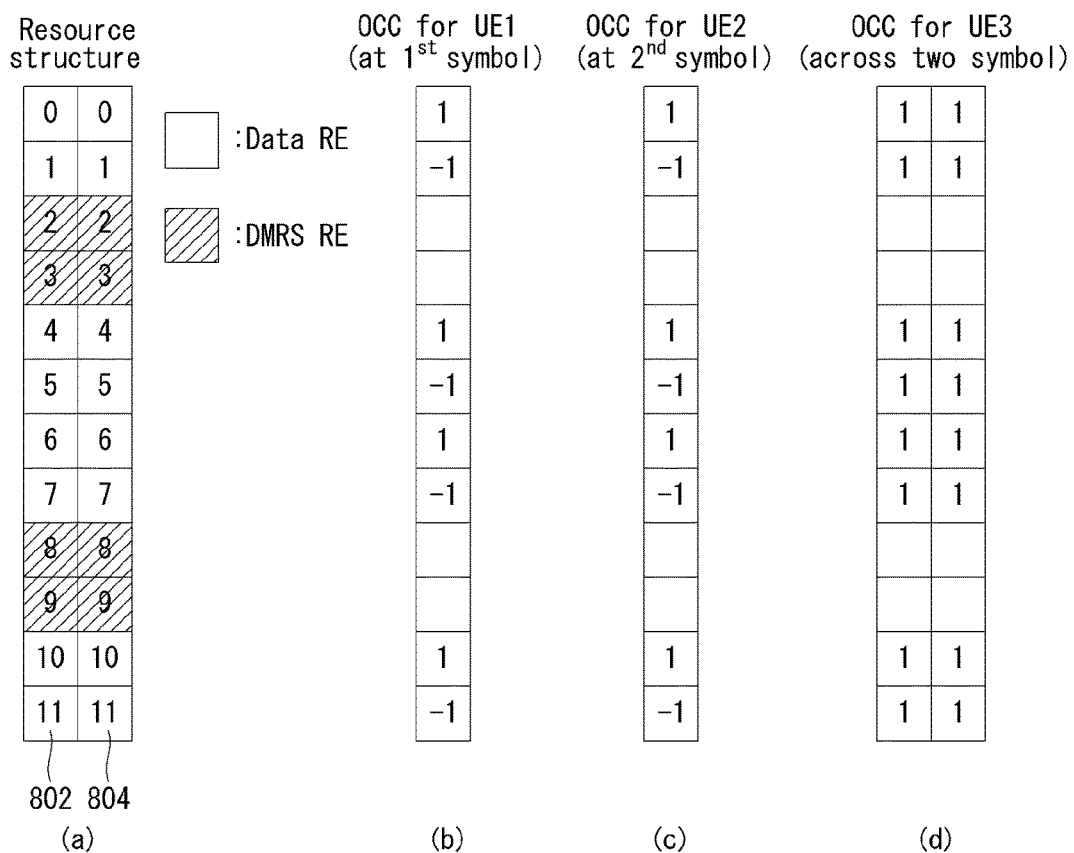
FIG. 8 illustrates one example of a CDM scheme between the terminals that support the uplink control channel having the same resource structure, to which the present invention can be applied.

FIG. 8 illustrates one example of a CDM scheme between the terminals that support the uplink control channel having the same resource structure, to which the present invention can be applied. FIG. 8 is only for convenience of the description and does not limit the scope of the present invention.

Referring to FIG. 8(a), a resource for transmitting an uplink channel may be configured by a resource element (RE) (i.e., Data RE) for transmitting data and a RE for transmitting a demodulation reference signal (i.e., DMRS RE). It is assumed that the resource is configured by two symbols (a first symbol (e.g., $1^{st}$ symbol) 802 and a second symbol (e.g., $2^{nd}$ symbol) 804).

In this case, the DMRS RE may be configured as a pseudo random sequence, and the CDM between the terminals may be performed by varying values of a random seed. Further, with respect to the Data RE, the CDM between the terminals may be performed by applying an orthogonal cover code (OCC) on a frequency axis.

FIG. 8(b) illustrates a Data RE structure of the first terminal that transmits the uplink information. The first terminal transmits uplink information using a first symbol 802, that is, one symbol, and OCC {1, −1} is allocated to Data REs of the first terminal.

FIG. 8(c) illustrates a Data RE structure of the second terminal that transmits the uplink information. The second terminal transmits uplink information using a second symbol 804, that is, one symbol, and OCC {1, −1} is allocated to Data REs of the second terminal.

FIG. 8(d) illustrates a Data RE structure of the third terminal that transmits the uplink information. The third terminal transmits uplink information using the first symbol 802 and the second symbol 804, that is, two symbols, and OCC {1, 1} is allocated to Data REs of the third terminal.

In this case, the first terminal and the second terminal may be multiplexed through the TDM scheme, and each of the first terminal and the second terminal may be multiplexed with the third terminal through the CDM scheme based on the OCC in each symbol. In FIG. 8, OCC having length-2 is used, but it is apparent that OCC having a different length may be used.

Further, a sequence (e.g., a Zadoff-Chu sequence) itself may be transmitted based on a sequence, instead of a structure in which a resource for transmitting the uplink channel is configured by the DMRS RE and the Data RE. In this case, the CDM between the terminals may be performed by varying a cyclic shift value of the sequence instead of the OCC in FIG. 8.

Also, in various embodiments of the present invention, inter-terminal multiplexing between the terminals may be basically performed through an FDM scheme between terminals having different resource structures for transmitting an uplink channel. For example, the FDM scheme may be used for multiplexing between a terminal transmitting an uplink channel with the structure illustrated in FIG. 8 and a URLLC terminal (when the DMRS RE is transmitted in a front symbol among the plurality of symbols of the uplink channel).

In this case, the FDM scheme may be a scheme which may perform FDM by a resource block (RB) unit, and perform FDM by a RE unit as illustrated in FIGS. 9A, 9B, 9C, and 10 using a comb structure. In this case, the configuration of the comb structure may be configured by a method in which the entire number of REs is equally maintained even though the used symbol number is different. For example, in all of a terminal using one symbol, a terminal using two symbols, and a terminal using three symbols, the comb structure may be configured by six REs.

Figure 9B:
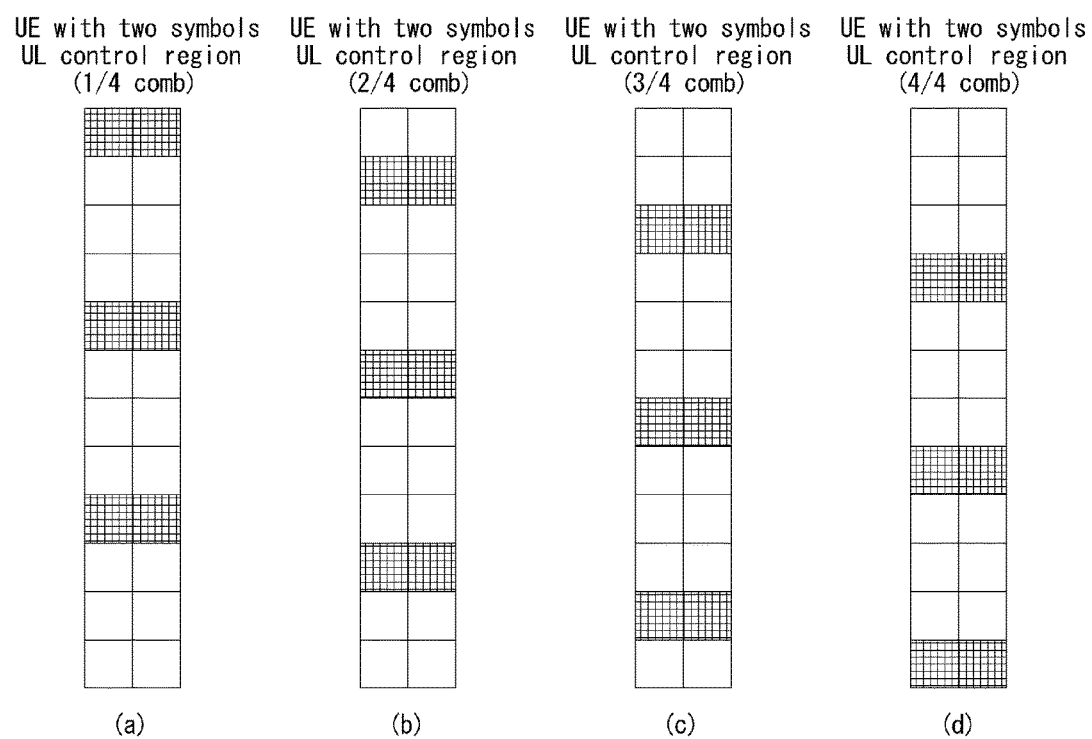
Figure 9C:
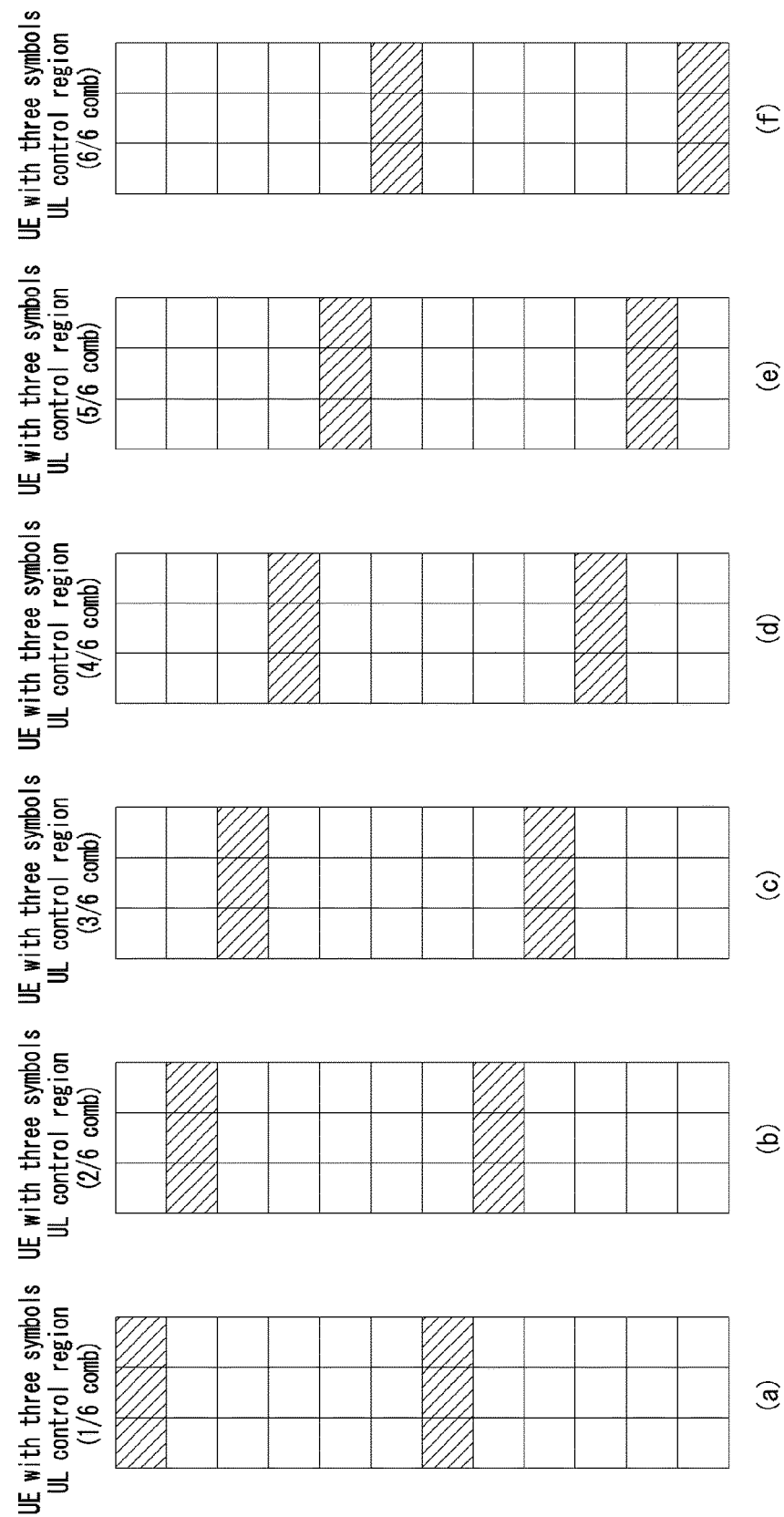

FIGS. 9A to 9C illustrate examples of a comb structure for a resource element of the uplink control channel, to which the present invention can be applied. FIGS. 9A to 9C are only for convenience of the description and do not limit the scope of the present invention.

More specifically, FIG. 9A illustrates comb structures of terminals supporting an uplink control channel region of one symbol. FIG. 9A(a) illustrates an even comb structure and FIG. 9A(b) illustrates an odd comb structure. Here, the even comb structure and the odd comb structure may be represented by a comb index of {0, 1} or {even, odd}.

Further, FIG. 9B illustrates comb structures of terminals supporting an uplink control channel region of two symbols. FIG. 9B(a) illustrates a 1/4 comb structure, FIG. 9B(b) illustrates a 2/4 comb structure, FIG. 9B(c) illustrates a 3/4 comb structure, and FIG. 9B(d) illustrates a 4/4 comb structure. Herein, the comb structures may be represented by a comb index of {0, 1, 2, 3} or {1/4, 2/4, 3/4, 4/4}.

Further, FIG. 9C illustrates comb structures of terminals supporting an uplink control channel region of three symbols. FIG. 9C(a) illustrates a 1/6 comb structure, FIG. 9C(b) illustrates a 2/6 comb structure, FIG. 9C(c) illustrates a 3/6 comb structure, FIG. 9C(d) illustrates a 4/6 comb structure, FIG. 9C(e) illustrates a 5/6 comb structure, and FIG. 9C(f) illustrates a 6/6 comb structure. Herein, the comb structures may be represented by a comb index of {0, 1, 2, 3, 4, 5} or {1/6, 2/6, 3/6, 4/6, 5/6, 6/6}.

Each terminal may be assigned an index for one of the comb structures illustrated in FIGS. 9A to 9C according to the number of symbols to be supported. In this case, the base station may allocate each index to each terminal so that resources of the terminals do not overlap. The base station may notify to the terminal an index for the comb structure, that is, a comb index, through higher layer signaling (e.g., radio resource control (RRC) signaling) and/or physical layer signaling. For example, in order to multiplex uplink control channels of the terminals, the base station may transmit an RRC message including a comb index allocated to each terminal. In this case, RRC configuration information on the comb index of the comb structure may be as illustrated in Table 1 below.

TABLE 1

| PUCCH-ConfigComb ::= | SEQUENCE { | | |
|---|---|---|---|
| PUCCH-1symbol-UE | ENUMERATED {even, odd} | OPTIONAL, | -- Need OR |
| PUCCH-2symbol-UE | ENUMERATED {1/4, 2/4, 3/4, 4/4} | OPTIONAL, | -- Need OR |
| PUCCH-3symbol-UE | ENUMERATED {1/6, 2/6, 3/6, 4/6, 5/6, 6/6} | OPTIONAL, | -- Need OR |
| } | | | |

Herein, the 1symbol-UE means a terminal supporting an uplink control channel region of one symbol, the 2symbol-UE means a terminal supporting an uplink control channel region of two symbols, and the 3symbol-UE means a terminal supporting an uplink control channel region of 3 symbols.

According to the above-described procedure, multiplexing between terminals using different comb structures according to the number of symbols may be performed as illustrated in FIG. 10.

FIG. 10 illustrates one example of comb structure multiplexing for the terminals in which the uplink control channel is configured in different structures and the different numbers of symbols, to which the present invention can be applied. FIG. 10 is only for convenience of the description and does not limit the scope of the present invention.

Referring to FIG. 10, it is assumed that the uplink control channels of the first terminal, the second terminal, and the third terminal are configured with different structures and different numbers of symbols. Further, each terminal receives a comb index and an index (i.e., a symbol index or a time index) for a starting point of a resource for each terminal from the base station. It is also assumed that each terminal uses six REs to transmit uplink control information.

Referring to FIG. 10(a), a first terminal supporting an uplink control channel region of one symbol receives a comb index corresponding to an odd comb and a symbol index corresponding to #2 symbol from the base station. Further, referring to FIG. 10(b), a second terminal supporting an uplink control channel region of two symbols receives a comb index corresponding to a 2/4 comb and a symbol index corresponding to #0 symbol from the base station. Further, referring to FIG. 10(c), a third terminal supporting an uplink control channel region of three symbols receives a comb index corresponding to a 1/6 comb and a symbol index corresponding to #0 symbol from the base station.

Accordingly, the uplink control channel regions of the first terminal, the second terminal, and the third terminal may be multiplexed without overlapping between the uplink control channel regions as illustrated in FIG. 10(d).

Further, in various embodiments of the present invention, the terminals do not receive symbol indexes indicating the starting points of the resources from the base station, but each uplink control channel region may be disposed according to a predefined rule in the system.

Figure 11:
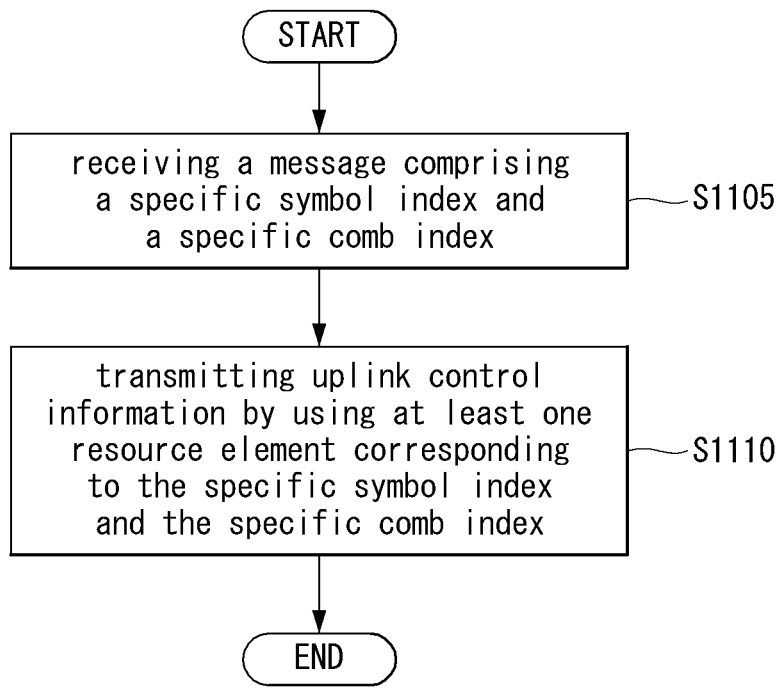
FIG. 11 illustrates one example of an operation flowchart of a terminal that transmits uplink control information, to which the present invention can be applied.

FIG. 11 illustrates one example of an operation flowchart of a terminal that transmits uplink control information, to which the present invention can be applied. FIG. 11 is only for convenience of the description and does not limit the scope of the present invention.

Referring to FIG. 11, it is assumed that the base station and the terminal operate in an NR system in which self-contained subframes are considered. Further, it is assumed that the NR system supports an uplink control channel region configured by at least one symbol. Here, the uplink control channel region including at least one symbol may mean a channel region for transmitting the uplink control information described in FIGS. 2 to 10.

In step S1105, the terminal receives a message including a specific symbol index and a specific comb index from the base station. In this case, the terminal may receive the message from the base station through higher layer signaling or physical layer signaling. In other words, the base station may allocate (or schedule) resources to be used for transmission of uplink control information of the terminal by using the specific symbol index and the specific comb index.

Herein, the specific symbol index indicates a starting point for the uplink control channel region of the terminal. Further, the specific comb index indicates a comb structure for the uplink channel region of the terminal. The specific comb index is similar to the symbol index and the comb index in the methods described above. That is, the specific symbol index means the symbol index described in a part related with FIG. 6, and the specific comb index may mean the comb index described in FIGS. 9A, 9B, 9C, and 10.

In this case, the uplink control channel region of the terminal may be included in the uplink control channel region including the at least one symbol supported by the NR system. Further, the uplink control channel region including the at least one symbol is included in the same subframe together with a downlink control channel region.

Further, the specific symbol index may indicate one starting point in at least one candidate point for the uplink control channel region of the terminal, as described above.

After the terminal receives the specific symbol index and the specific comb index from the base station, in step S1110, the terminal may transmit the uplink control information to the base station by using at least one RE corresponding to the received specific symbol index and the received specific index. Herein, the uplink control information may include ACK/NACK, SR, and/or CSI.

Herein, the at least one RE corresponding to the received specific symbol index and the received specific comb index does not overlap with an RE of an uplink control channel region of another terminal supported by the base station (that is, an RE allocated for transmitting uplink control information of another terminal). Further, as described above, in this case, the number of REs used for transmitting uplink control information by the terminal and the number of REs used for transmitting uplink control information by another terminal may be the same as each other.

Through the above-described procedures and methods, in the self-contained subframe structure considered in the NR system, the uplink control channel region for transmitting the uplink control information by the terminal may be efficiently configured.

General Apparatus to which the Present Invention May be Applied

Figure 12:
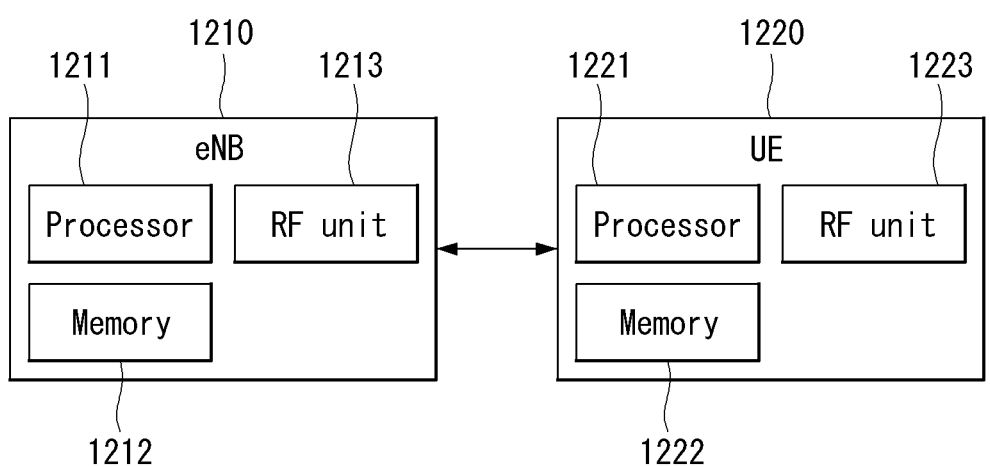
FIG. 12 illustrates a block diagram of a wireless communication apparatus according to an embodiment of the present invention.

FIG. 12 illustrates a block diagram of a wireless communication apparatus according to an embodiment of the present invention.

Referring to FIG. 12, the wireless communication system includes a network node 1210 and a plurality of terminals (UEs) 1220.

The network node 1210 includes a processor 1211, a memory 1212 and a communication module 1213. The processor 1211 implements the functions, processes and/or methods proposed in FIGS. 1 to 11 above. The layers of wire/wireless interface protocol may be implemented by the processor 1211. The memory 1212 is connected to the processor 1211, and stores various types of information for driving the processor 1211. The communication module 1213 is connected to the processor 1211, and transmits and/or receives radio signals. Particularly, when the network node 1210 is base station (eNB), the communication may comprise a radio frequency unit for transmitting and/or receiving radio signals.

The terminal 1220 includes a processor 1221, a memory 1222 and a communication module (alternatively, RF unit) 1223. The processor 1221 implements the functions, processes and/or methods proposed in FIGS. 1 to 11 above. The layers of wireless interface protocol may be implemented by the processor 1221. The memory 1222 is connected to the processor 1221, and stores various types of information for driving the processor 1221. The communication module 1223 is connected to the processor 1221, and transmits and/or receives radio signals.

The memories 1212 and 1222 may be located interior or exterior of the processors 1211 and 1221, and may be connected to the processors 1211 and 1221 with well known means. In addition, the network node 1210 (eNB) and/or the terminal 1220 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

Although the method for transmitting uplink control information in a wireless communication system of the present invention is described mainly for the example applied to 3GPP LTE/LTE-A system, it is also possible to be applied to various wireless communication system as well as 3GPP LTE/LTE-A system.

What is claimed is:

1. A method for transmitting uplink (UL) control information in a wireless communication system supporting an UL control channel region configured in a plurality of symbols, the method performed by a terminal and comprising:
receiving a message from a base station (BS), the message comprising a symbol index related to a starting point of an UL control channel allocated to the terminal and a comb index related to one of a plurality of candidate comb structures for the UL control channel; and
transmitting the UL control information to the BS on an UL control channel determined based on the symbol index and the comb index,
wherein the plurality of candidate comb structures are configured based on a number of symbols of the UL control channel in a time domain,
wherein the UL control channel region is determined based on first information related to a transmission of the UL control information and second information unrelated to the transmission of the UL control information,
wherein the first information includes at least an acknowledgement (ACK), a negative-acknowledgement (NACK), a scheduling request (SR) or channel state information (CSI),
wherein the second information includes coverage of the terminal, urgency of the terminal and a subband of a system bandwidth, and
wherein the number of symbols is determined based on the coverage of the terminal.

2. The method of claim 1, wherein the UL control channel region is included in a same frame with a downlink control channel region.

3. The method of claim 1, wherein the symbol index is further related to one of at least one candidate symbol for the UL control channel region in the time domain.

4. The method of claim 3, wherein:
the symbol index is further related to one of 0, 1, to $$\left(\left\lceil \frac{k}{j} \right\rceil - 1\right);$$

k represents a number of the plurality of symbols configuring the UL control channel region; and
j represents a number of symbols configuring the UL control channel.

5. The method of claim 3, wherein at least one resource element of the UL control channel is not overlapped with at least another resource element allocated for transmitting UL control information of another terminal supported by the BS.

6. The method of claim 5, wherein a number of the at least one resource element is equal to a number of the at least another resource element.

7. The method of claim 3, wherein the message is received based on higher layer signaling or physical layer signaling.

8. An apparatus for transmitting uplink (UL) control information in a wireless communication system supporting an UL control channel region configured in a plurality of symbols, the apparatus comprising:
a transceiver configured to transmit and receive a radio signal; and
a processor functionally coupled to the transceiver, the processor configured to:
control the transceiver to receive a message from a base station (BS), the message comprising a symbol index related to a starting point of an UL control channel allocated to the terminal and a comb index related to one of a plurality of candidate comb structures for the UL control channel; and
control the transceiver to transmit the UL control information to the BS on an UL control channel determined by using the symbol index and the comb index,
wherein the plurality of candidate comb structures are configured based on a number of symbols of the UL control channel in a time domain,
wherein the UL control channel region is determined based on first information related to a transmission of the UL control information and second information unrelated to the transmission of the UL control information,
wherein the first information includes at least an acknowledgement (ACK), a negative-acknowledgement (NACK), a scheduling request (SR) or channel state information (CSI),
wherein the second information includes coverage of the terminal, urgency of the terminal and a subband of a system bandwidth, and
wherein the number of symbols is determined based on the coverage of the terminal.

9. The method of claim 3, wherein the plurality of candidate comb structures are determined based on a position of the UL control channel in a frequency domain.

10. The apparatus of claim 8, wherein the symbol index is further related to one of at least one candidate symbol for the UL control channel region in the time domain.

11. The apparatus of claim 10, wherein the plurality of candidate comb structures are determined based on a position of the UL control channel in a frequency domain.

12. The apparatus of claim 10, wherein:
the symbol index is further related to one of 0, 1, to $$\left(\left\lceil \frac{k}{j} \right\rceil - 1\right);$$

k represents a number of the plurality of symbols configuring the UL control channel region; and j represents a number of symbols configuring the uplink control channel.

13. The apparatus of claim 10, wherein at least one resource element of the UL control channel is not overlapped with at least another resource element allocated for transmitting UL control information of another terminal supported by the BS.

14. The apparatus of claim 13, wherein a number of the at least one resource element is equal to a number of the at least another resource element.

15. The apparatus of claim 10, wherein the message is received based on higher layer signaling or physical layer signaling.

16. The apparatus of claim 8, wherein the UL control channel region is included in a same frame with a downlink control channel region.

\* \* \* \* \*